US010677044B2

(12) United States Patent
Ahmadi Kalateh Ahmad et al.

(10) Patent No.: US 10,677,044 B2
(45) Date of Patent: Jun. 9, 2020

(54) MAGNETIC RANGING USING MULTIPLE DOWNHOLE ELECTRODES (71) Applicant: Halliburton Energy Services, Inc., Houston, TX (US)

(72) Inventors: Akram Ahmadi Kalateh Ahmad, Houston, TX (US); Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 126 days.

(21) Appl. No.: 15/558,499

(22) PCT Filed: Apr. 23, 2015

(86) PCT No.: PCT/US2015/027373
§ 371 (c)(1),
(2) Date: Sep. 14, 2017

(87) PCT Pub. No.: WO2016/171703
PCT Pub. Date: Oct. 27, 2016

(65) Prior Publication Data
US 2018/0081076 A1 Mar. 22, 2018

(51) Int. Cl.
E21B 47/09 (2012.01)
E21B 7/04 (2006.01)
(Continued)

(52) U.S. Cl.
CPC .............. *E21B 47/09* (2013.01); *E21B 7/04* (2013.01); *E21B 47/02216* (2013.01);
(Continued)

(58) Field of Classification Search
CPC ........ E21B 47/09; E21B 47/0905; E21B 7/04; G01V 3/12; G01V 3/30
See application file for complete search history.

(56) References Cited

U.S. PATENT DOCUMENTS 4,529,939 A 7/1985 Kuckes
4,770,034 A * 9/1988 Titchener ................ E21B 43/26
340/854.3
(Continued)

FOREIGN PATENT DOCUMENTS

| GB | 2481506 A | 9/2012 |
|---|---|---|
| RU | 2229735 C1 | 5/2004 |
| WO | 199321589 A1 | 10/1993 |

OTHER PUBLICATIONS

Australian Application Serial No. 2015392091; First Examination Report; dated Jul. 25, 2018, 3 pages.
(Continued)

Primary Examiner — Caroline N Butcher
(74) Attorney, Agent, or Firm — Gilliam IP PLLC (57) ABSTRACT A magnetic ranging system, in some embodiments, comprises: a wellbore in a formation; a conductive casing in said wellbore; and excitation and return electrodes electrically coupled to the conductive casing, the excitation electrode positioned downhole relative to the return electrode, the excitation and return electrodes generating a current in the casing, said current resulting in an electromagnetic signal that propagates through said formation toward a sensor in another wellbore.

16 Claims, 8 Drawing Sheets (51) Int. Cl.
*E21B 47/022* (2012.01)
*G01V 3/30* (2006.01)
*G01V 3/12* (2006.01)

(52) U.S. Cl.
CPC ........... *E21B 47/0905* (2013.01); *G01V 3/30* (2013.01); *G01V 3/12* (2013.01)

(56) References Cited

U.S. PATENT DOCUMENTS

| | | | | |
|---|---|---|---|---|
| 5,218,301 | A * | 6/1993 | Kuckes | E21B 47/02 |
| | | | | 324/207.26 |
| 5,642,051 | A * | 6/1997 | Babour | E21B 17/003 |
| | | | | 324/357 |
| 6,396,276 | B1 | 5/2002 | Van Steenwyk et al. | |
| 2005/0206385 | A1 | 9/2005 | Strack et al. | |
| 2007/0278008 | A1 | 12/2007 | Kuckes et al. | |
| 2009/0308657 | A1 | 12/2009 | Clark et al. | |
| 2010/0155139 | A1 * | 6/2010 | Kuckes | E21B 47/02216 |
| | | | | 175/45 |
| 2013/0319659 | A1 * | 12/2013 | Freedman | E21B 7/04 |
| | | | | 166/250.01 |
| 2016/0273337 | A1 * | 9/2016 | Donderici | E21B 47/02216 |

OTHER PUBLICATIONS

Canadian Application Serial No. 2,979,667; Third Office Action; dated Jul. 19, 2018, 4 pages.
Russian Application Serial No. 2017131727; Notice of Decision to Grant; dated May 23, 2018, 4 pages.
"International Application Serial No. PCT/US2015/027373, International Preliminary Report on Patentability dated Feb. 24, 2017", 18 pages.
"International Application Serial No. PCT/US2015/027373, International Search Report dated Jan. 24, 2016", 4 pages.
"International Application Serial No. PCT/US2015/027373, Written Opinion dated Jan. 14, 2016", 8 pages.
AR Application Serial No. 20160100719, Office Action, dated Jul. 30, 2019, 2 pages.
Canadian Application Serial No. 2,979,667; Office Action; dated Jun. 26, 2019, 4 pages.
Indian Application Serial No. 201717029058; First Exam Report; dated Aug 19, 2019, 5 pages.
ID Application Serial No. P00201705808, Office Action, dated Dec. 20, 2019, 3 pages.

* cited by examiner

MAGNETIC RANGING USING MULTIPLE DOWNHOLE ELECTRODES

BACKGROUND

Multiple wells are often drilled in a single formation. It is generally desirable to monitor the distance between adjacent wells (a process called "ranging") as one or more of them are being drilled to inhibit the likelihood that the wells will interfere with each other. Without such monitoring, for example, adjacent wells may intersect, or they may be drilled so close together that subsequent hydraulic fracturing operations cause undesirable interactions between the wells. Additional advantages may be gained through such inter-well distance measurements.

BRIEF DESCRIPTION OF THE DRAWINGS

Accordingly, there are disclosed in the drawings and in the following description a magnetic ranging technique using multiple downhole electrodes. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are various magnetic ranging techniques in which multiple downhole electrodes are used to excite the well casing. In at least some embodiments, for example, a pair of electrodes are positioned within a wellbore so that they electrically couple to the casing, with an excitation electrode being positioned farther downhole than a return electrode. A current is applied to the casing between the electrodes, resulting in the generation of an electromagnetic field that is detected by sensors in one or more adjacent wells and that is used to determine a distance between the wells. The spacing between the electrodes may be fine-tuned to achieve a desired current distribution profile throughout the length of the casing—for instance, minimal current at the surface to mitigate safety concerns, and sufficient current throughout the rest of the casing so as to generate an electromagnetic field having a desired distribution. Placing the return electrode in the wellbore also eliminates the need to stake the return electrode in the ground at the surface, several hundred meters away from the well. This improves personnel and equipment safety, since such surface-level return electrodes are often connected to surface equipment at the wellhead through rough and potentially unsafe terrain, such as dense woods and wetlands.

Figure 1:
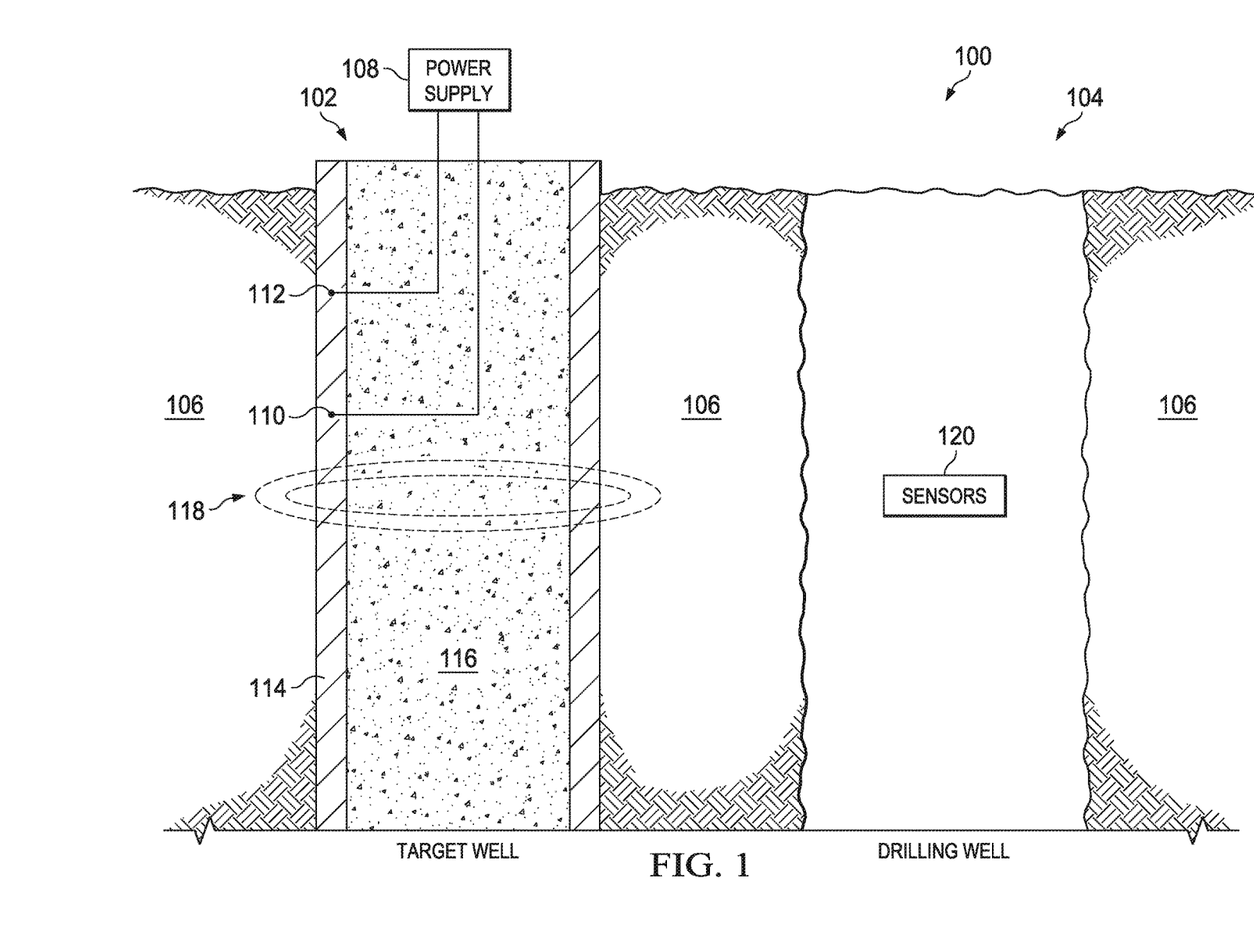
FIG. 1 is a conceptual diagram of an illustrative magnetic ranging technique.

FIG. 1 is a conceptual diagram of an illustrative magnetic ranging technique. A magnetic ranging system 100 includes multiple wellbores 102, 104 drilled in a formation 106. The wellbore 102 is already completed and cased, and the wellbore 104 is either complete or is in the process of being drilled. The wellbore 102 includes an excitation electrode 110 and a return electrode 112. In at least some embodiments, the excitation electrode is positioned downhole relative to the return electrode, although the reverse arrangement is also contemplated. Both electrodes 110, 112 couple to a power supply 108 located at the surface (for example, in an equipment truck or other suitable surface facility) or downhole (e.g., in a sonde). The power supply 108 may provide current via the excitation electrode 110, including direct current (DC) or alternating current (AC) at relatively low frequencies (e.g., 20 Hz or less) or higher frequencies (e.g., just above 20 Hz up to and including 200 Hz). The electrodes 110, 112 couple to and excite a well casing 114, as described below. The wellbore 102 typically contains mud 116 inside the casing 114. The wellbore 104 contains one or more sensors 120. The positions of the sensors 120 depend at least in part on the status of the wellbore 104. If the wellbore 104 is being drilled, the sensors 120 may be disposed within a drill string (e.g., in a bottom hole assembly). If the wellbore 104 is complete, the sensors 120 may be positioned in a wireline tool, in a casing, in a cement sheath, or some combination thereof. Other positions for the sensors 120 are contemplated and included in the scope of the disclosure. Because the positioning of the sensors 120 is variable, FIG. 1 does not depict any particular type of downhole equipment in the wellbore 104.

In operation, the excitation electrode 110 and return electrode 112 induce a current in the casing 114. Because electrode 112 is a return, the majority of the current passes from the excitation electrode 110 to the return electrode 112 and a smaller proportion of the current flows downhole from the excitation electrode 110. If the electrodes 110, 112 are located too close together (e.g., less than 50 meters), nearly all current passes to the return electrode 112, and very little current flows downhole from the excitation electrode 110. This is undesirable because a lack of current flow below the excitation electrode 110 results in an inadequate electromagnetic field for ranging purposes. If the electrodes 110, 112 are located farther apart (e.g., 100 meters or more), however, the majority of the current in the casing 114 still flows between the electrodes, but a greater proportion of the current flows downhole from the excitation electrode 110. The additional current flow downhole from the excitation electrode 110 results in an electromagnetic field 118 that is suitable for use in a magnetic ranging application because it is more evenly distributed along the length of the wellbore 102 than it would be were the electrodes placed closer together. The sensors 120 then detect the field 118 and use the detected electromagnetic signals to determine the distance between the wellbores 102, 104.

Figure 2:
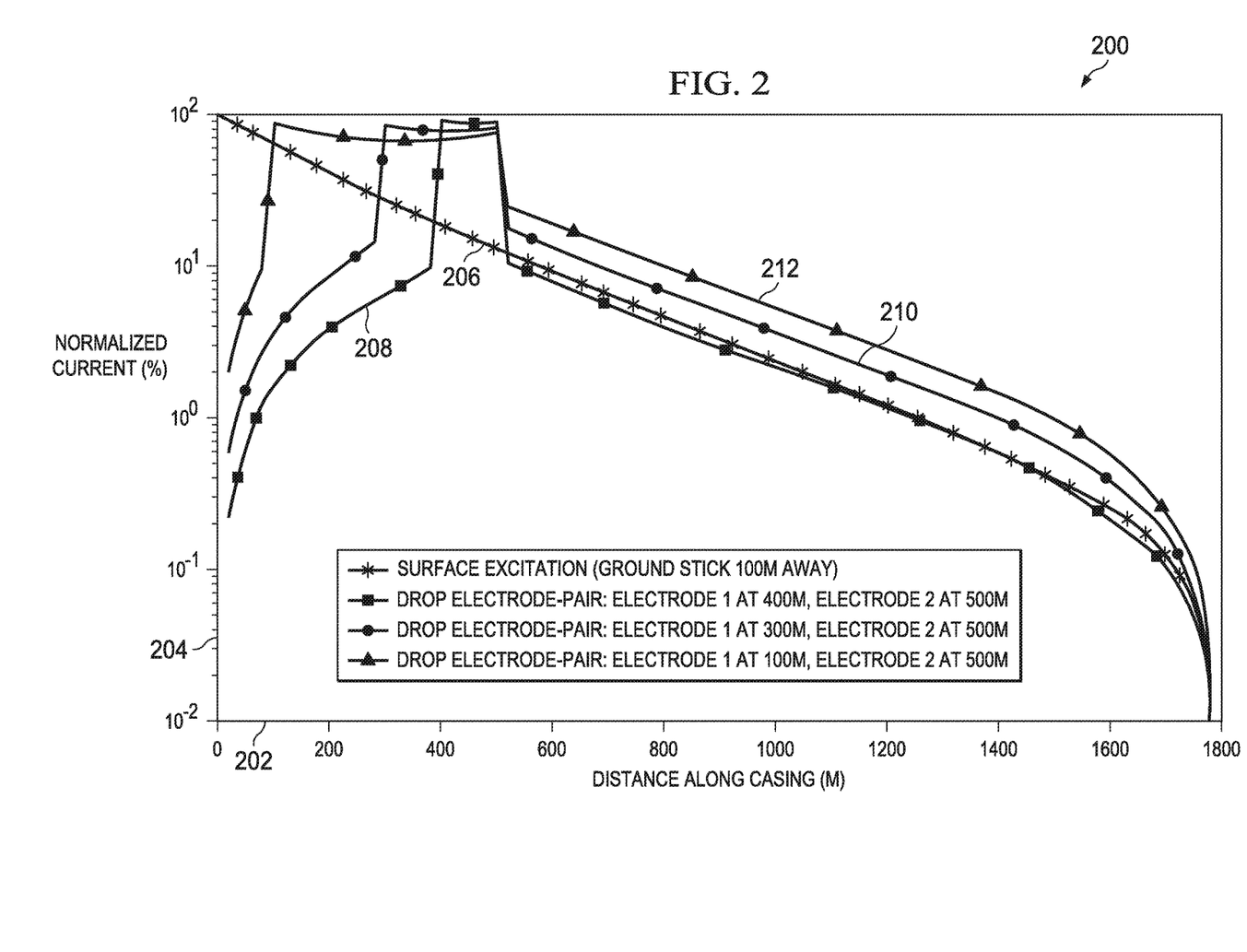
FIG. 2 is a graph illustrating casing current distribution as a function of electrode placement.

FIG. 2 is a graph 200 illustrating casing current distribution as a function of electrode placement. The x-axis 202 denotes downhole distance along the casing as measured from the surface, and the y-axis 204 denotes normalized current. Curve 206 represents an electrode placement scheme in which an excitation electrode is placed in the wellbore near the surface and a return electrode is staked into the ground, on the surface, approximately 100 meters away from the well. As curve 206 shows, the current is substantial at the surface and dissipates almost linearly as distance along the casing increases, with a sharp drop-off at the end of the well. This current distribution profile is suboptimal because of the excessive current near the surface (which poses safety hazards) and because of the relatively low levels of current flowing to the end of the casing. Curves 208, 210, 212 are produced by electrodes positioned in accordance with embodiments. Specifically, curve 208 represents an electrode placement scheme in which the excitation electrode is positioned at 500 meters downhole and the return electrode is at 400 meters downhole, resulting in a separation of 100 meters. Curve 210 represents an electrode placement scheme in which the excitation electrode is positioned at 500 meters downhole and the return electrode is at 300 meters downhole, resulting in a separation of 200 meters. Finally, with curve 212, the excitation electrode is positioned at 500 meters downhole and the return electrode is placed at 100 meters downhole, resulting in a separation of 400 meters.

Each of the curves 208, 210, 212 has a region of high current between the points along the casing at which the electrodes are placed. These regions of high current exist because the majority of current applied to the casing by the excitation electrode flows directly to the return electrode. However, along portions of the casing uphole of the return electrodes, the curves 208, 210, 212 indicate a sharp current drop-off. This is due to the fact that the excitation electrode is farther downhole from the surface than it is with the curve 206 and because the return electrode is inside the wellbore (with curve 206, it is staked into the surface of the earth). This current drop-off in curves 208, 210, 212 is desirable because it mitigates safety concerns for equipment and personnel at or near the surface. The closer the return electrode is placed to the surface, however, the greater the current near the surface, as the progression of curves 208, 210, 212 indicates. In addition, the curves 208, 210, 212 demonstrate a general increase in the level of current present along the casing downhole of the excitation electrode. As the progression of curves 208, 210, 212 indicates, the greater the distance between the electrodes, the less the current flows toward the return electrode and the more the current flows downhole toward the end of the well. The scope of the disclosure is not limited to the specific electrode placements shown in FIG. 2, nor is FIG. 2 representative of current distribution profiles in all wells. Electrodes may be placed along the casing as desired and may be fine-tuned to achieve a desired current distribution profile and desired electromagnetic field. For example, in some embodiments, a distance between the return electrode and the excitation electrode is greater than another distance between the excitation electrode and a downhole end of the casing. In other embodiments, the reverse is true. In addition, FIG. 2 is merely illustrative in the sense that electrodes placed precisely as depicted in FIG. 2 but in a different well with different physical characteristics may result in different current distribution profiles.

Figure 3:
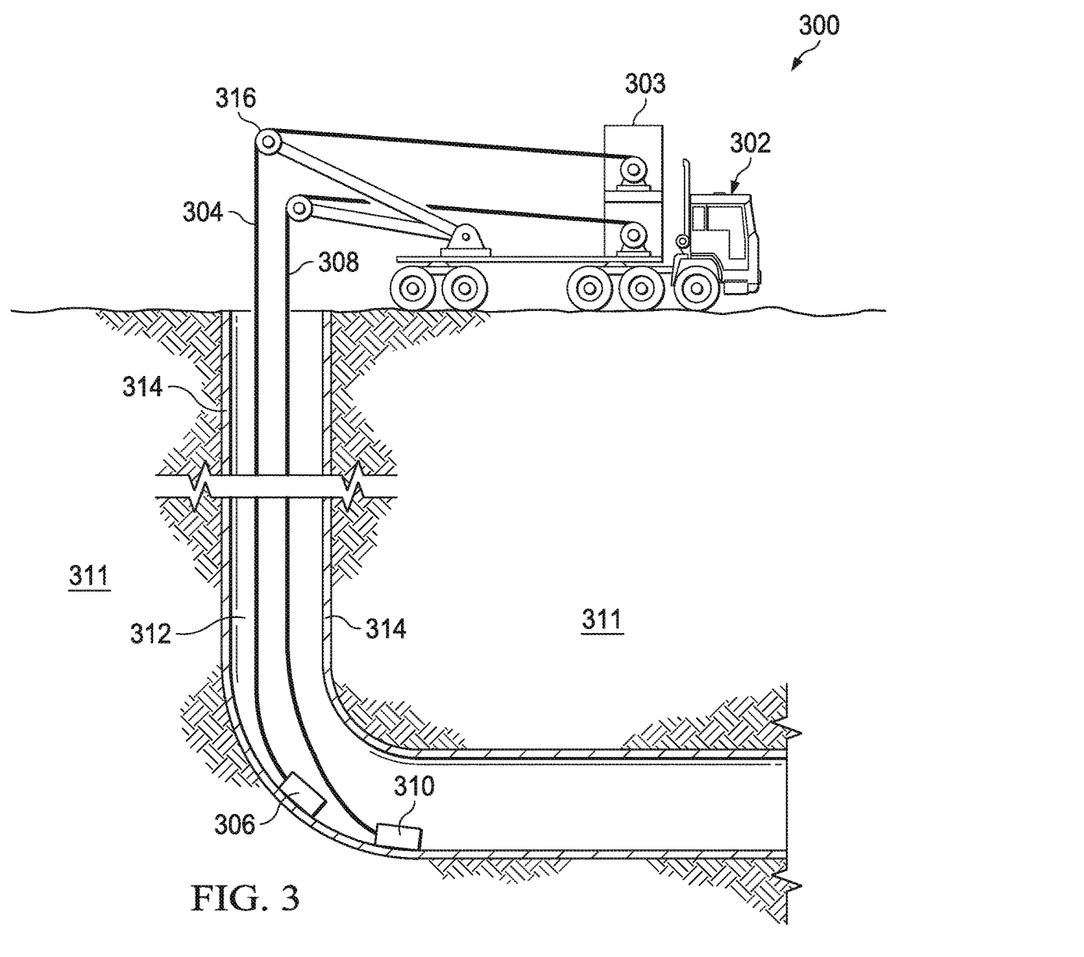
FIG. 3 is a schematic diagram of a well containing multiple electrodes for magnetic ranging.

FIG. 3 is a schematic diagram of a well containing multiple electrodes for magnetic ranging. Specifically, FIG. 3 shows a drilling environment 300 including an equipment truck 302; surface equipment 303; an insulated, conductive wire 304 that electrically couples to a return electrode 306; and an insulated, conductive wire 308 that electrically couples to an excitation electrode 310. The electrodes 306, 310 electrically couple to a conductive casing 314. The wires 304, 308 and electrodes 306, 310 are disposed within a wellbore 312 (drilled within a formation 311) using a pulley system 316 of the equipment truck 302. Other systems for lowering the wires 304, 308 and electrodes 306, 310 into the wellbore 312 are contemplated. In at least some embodiments, the electrodes 306, 310 are dropped to refusal. In at least some embodiments, one or more of the electrodes 306, 310 are positioned in or within 100 meters of the build section of the wellbore 312. Other electrode positions or placement techniques are contemplated.

In operation, the surface equipment 303, which includes a power source (e.g., a current source), provides current to the casing 314 via the excitation electrode 310. The majority of this current flows to the return electrode 306 and back toward surface equipment 303. At least some of the current flows past the return electrode 306 toward the surface, and at least some of the current flows downhole from the excitation electrode 310. Regardless of the direction in which the current is flowing, the current in the casing 314 induces an electromagnetic field (also called "electromagnetic signals" herein) in the formation 311. Sensors associated with an adjacent well (not specifically shown) may then detect the electromagnetic signals and use the signals to perform a ranging operation to determine the distance between the wells.

Figure 4:
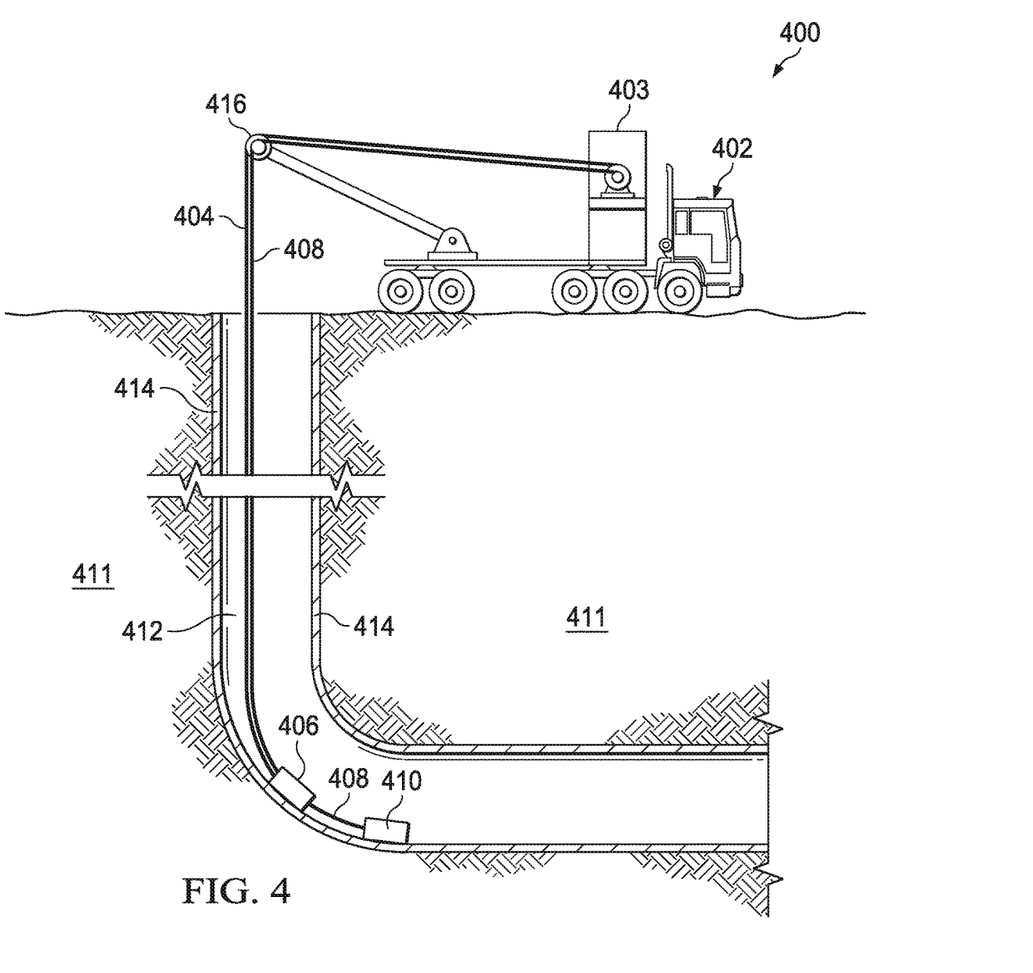
FIG. 4 is another schematic diagram of a well containing multiple electrodes for magnetic ranging.

FIG. 4 is another schematic diagram of a well containing multiple electrodes for magnetic ranging. FIG. 4 is similar to FIG. 3 except for the manner in which wires couple the electrodes to surface equipment and to each other. FIG. 4 shows a drilling environment 400 including an equipment truck 402; surface equipment 403; an insulated, conductive wire 404 that electrically couples to a return electrode 406; and an insulated, conductive wire 408 that electrically couples to an excitation electrode 410 and that mechanically couples to the electrode 406. The electrodes 406, 410 electrically couple to a casing 414. The wires 404, 408 and electrodes 406, 410 are disposed within a wellbore 412 (drilled within a formation 411) using a pulley system 416 of the equipment truck 402. Other systems for lowering the wires 404, 408 and electrodes 406, 410 into the wellbore 412 are contemplated. In at least some embodiments, the electrodes 406, 410 are dropped to refusal. In at least some embodiments, one or more of the electrodes 406, 410 are positioned in or within 100 meters of the build section of the wellbore 412. Other electrode positions or placement techniques are contemplated. The wire 408 mechanically couples to the electrode 406 to reduce the likelihood—or at least the consequences—of entanglement between the electrode wires 404, 408. Illustrative techniques for such mechanical coupling are described below with regard to FIGS. 6-7B. The electrical operation of the system shown in FIG. 4 is similar to that of the system shown in FIG. 3.

Figure 5:
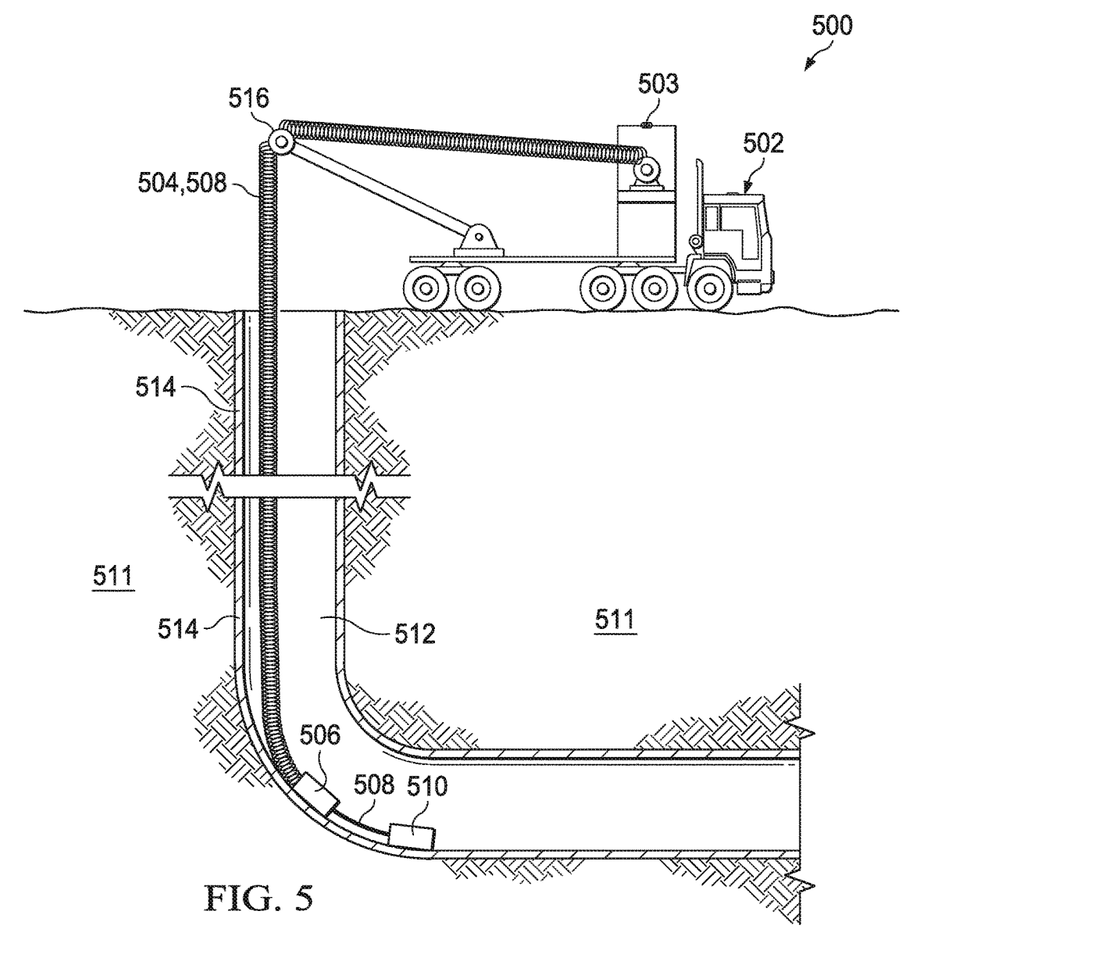
FIG. 5 is another schematic diagram of a well containing multiple electrodes for magnetic ranging.

FIG. 5 is another schematic diagram of a well containing multiple electrodes for magnetic ranging. FIG. 5 is similar to FIGS. 3 and 4 except for the manner in which the wires couple the electrodes to surface equipment and to each other.

FIG. 5 shows a drilling environment 500 including an equipment truck 502; surface equipment 503; an insulated, conductive wire 504 that electrically couples to a return electrode 506; and an insulated, conductive wire 508 that electrically couples to an excitation electrode 510 and that mechanically couples to the electrode 506. The electrodes 506, 510 electrically couple to a casing 514. The wires 504, 508 and electrodes 506, 510 are disposed within a wellbore 512 (drilled within a formation 511) using a pulley system 516 of the equipment truck 502. Other systems for lowering the wires 504, 508 and electrodes 506, 510 into the wellbore 512 are contemplated. In at least some embodiments, the electrodes 506, 510 are dropped to refusal. In at least some embodiments, one or more of the electrodes 506, 510 are positioned in or within 100 meters of the build section of the wellbore 512. Other electrode positions or placement techniques are contemplated. The wires 504, 508 are intertwined with each other from the surface down to the electrode 506. At the electrode 506, the wire 504 electrically couples to the electrode 506 and the wire 508 mechanically couples to the electrode 506. The wire 508 continues past the electrode 506 and electrically couples to the electrode 510. Illustrative techniques for such mechanical coupling are described below with regard to FIGS. 6-7B. The electrical operation of the system shown in FIG. 5 is similar to that of the systems shown in FIGS. 3 and 4.

Figure 6:
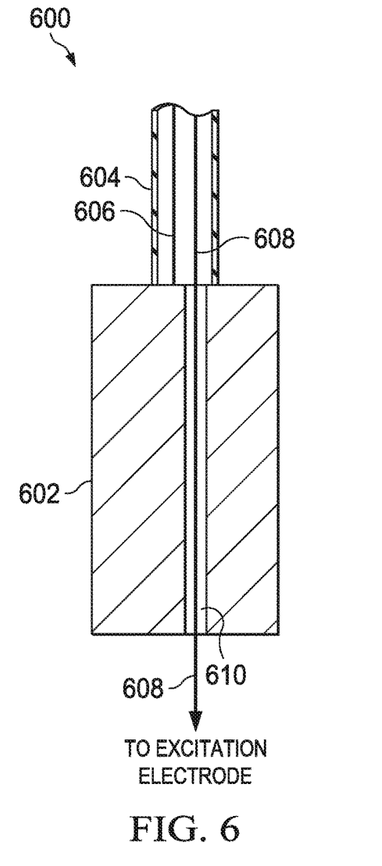
FIG. 6 is a cross-sectional view of a return electrode having an orifice through which a wire for an excitation electrode may pass.
Figure 7A:
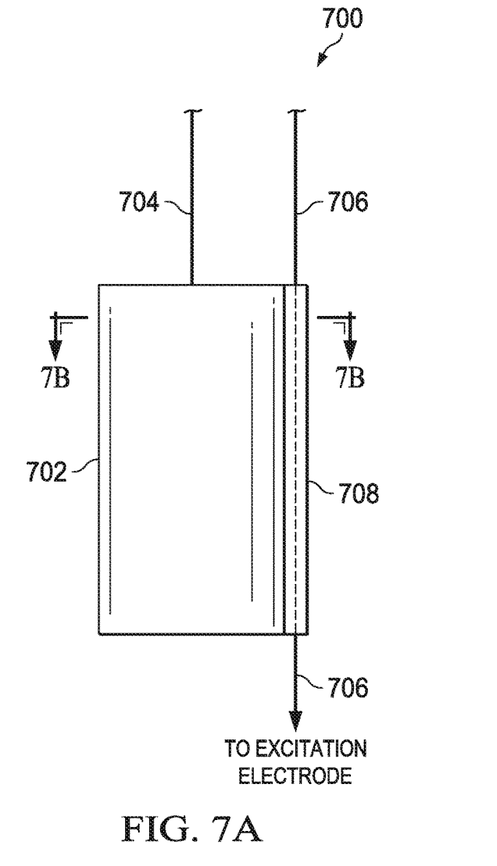
FIG. 7A is a side view of a return electrode having a coupling device through which a wire for an excitation electrode may pass.
Figure 7B:
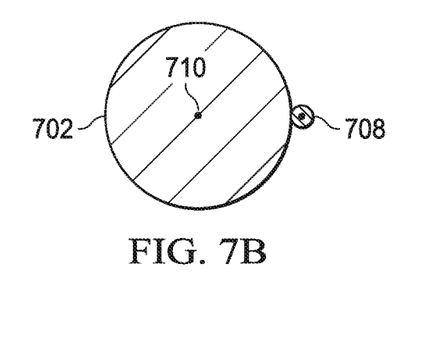
FIG. 7B is a top-down view of the return electrode and coupling device of FIG. 7A.

FIGS. 6-7B depict the mechanical coupling between a return electrode and the wire supplying an excitation electrode, as mentioned above. FIG. 6 is a cross-sectional view of a return electrode having an orifice through which a wire for an excitation electrode may pass. Specifically, an illustrative system 600 includes a return electrode 602; an insulated sheath 604; insulated, conductive wires 606, 608; and an orifice 610 formed axially through the electrode 602. Although the illustrative systems in FIGS. 3-5 do not include an insulated sheath as does system 600, the sheath 604 is included in system 600 to show another illustrative embodiment for preventing wire entanglements. The wires 606, 608 electrically couple to a power source in surface equipment. Wire 606 electrically couples to the return electrode 602, and wire 608 mechanically couples to the return electrode 602 in the sense that it passes through the orifice 610 formed within the electrode 602. In at least some embodiments, the orifice 610 is narrow enough that it clamps to and prevents movement of the wire 608 within the orifice 610. After passing through the orifice 610, the wire 608 continues on to electrically couple to an excitation electrode.

FIG. 7A is a side view of a return electrode having a coupling device through which a wire for an excitation electrode may pass. Specifically, an illustrative system 700 includes a return electrode 702; insulated, conductive wires 704, 706; and a coupling device 708 external to the return electrode 702. In some embodiments, the coupling device 708 is a cylindrical conduit that extends the length of the electrode 702, although the device 708 may be of any suitable shape and length. The wires 704, 706 electrically couple to a current source at the surface. The wire 704 electrically couples to the return electrode 702, and the wire 706 mechanically couples to the return electrode 702 in the sense that it passes through the coupling device 708, which is attached to the return electrode 702. In at least some embodiments, the coupling device 708 is narrow enough to clamp onto and preclude movement of the wire 708 inside the device 708. FIG. 7B shows a top-down view of the return electrode 702 and coupling device 708. The wire 704 electrically couples to the return electrode 702 at point 710, while wire 706 passes through the coupling device 708.

Figure 8A:
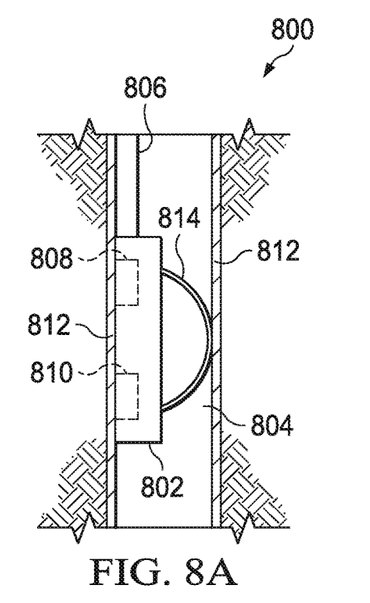
FIG. 8A is a schematic diagram of a wireline sonde having electrodes that electrically couple to a well casing with the aid of a bow spring.

FIG. 8A is a schematic diagram of a wireline sonde having electrodes that electrically couple to a well casing with the aid of a bow spring. The illustrative system 800 includes a sonde 802 suspended in a wellbore 804 by a wireline 806. The sonde 802 includes a return electrode 808 and an excitation electrode 810 that, in at least some embodiments, are flush with the exterior surface of the sonde 802. The sonde couples to a non-conducting bow spring 814 that pushes against a side of the casing 812 opposite the side of the casing 812 that faces the electrodes 808, 810. In this way, the electrodes 808, 810 make electrical contact with the casing 812. The body of the sonde 802 is preferably insulated so as to prevent current dissipation from the casing 812. The electrical operation of the system 800 is similar to that of the systems shown in FIGS. 3-5.

Figure 8B:
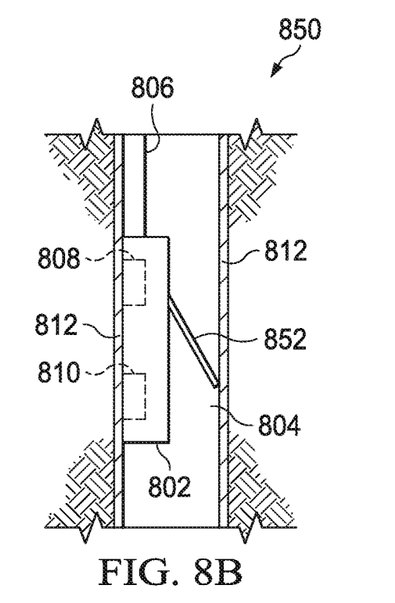
FIG. 8B is a schematic diagram of a wireline sonde having electrodes that electrically couple to a well casing with the aid of a retractable arm.

FIG. 8B is a schematic diagram of a wireline sonde having electrodes that electrically couple to a well casing with the aid of a retractable arm. The illustrative system 850 is similar to the system 800 of FIG. 8A, except that an insulated, retractable arm 852 is used in lieu of the bow spring 814 to press the electrodes 808, 810 against the casing 812.

Figure 8C:
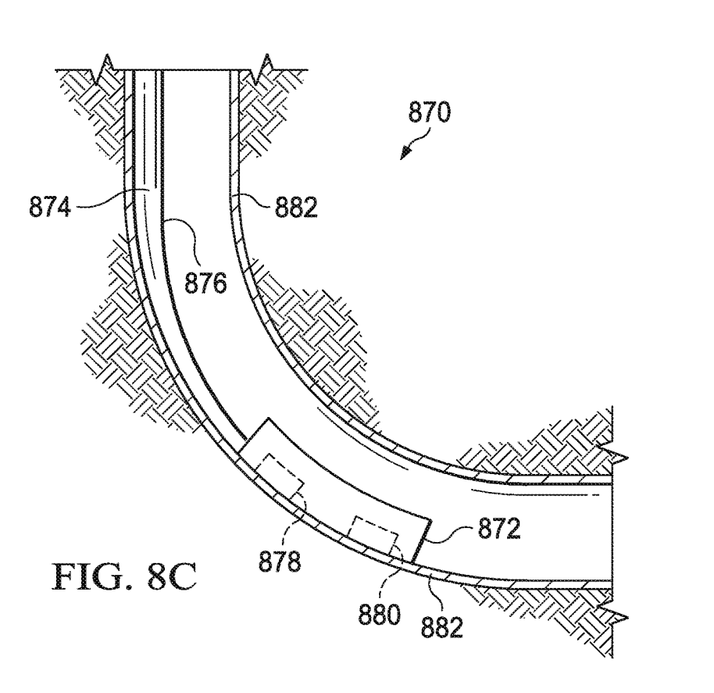
FIG. 8C is a schematic diagram of a wireline sonde having electrodes that rest against a well casing in a build section of the well.

FIG. 8C is a schematic diagram of a wireline sonde having electrodes that rest against a well casing in a build section of the well. The illustrative system 870 includes an insulated sonde 872 positioned in a wellbore 874 using a wireline 876. The sonde 872 includes a return electrode 878 and excitation electrode 880, which, in some embodiments, are flush with the surface of the sonde 872, although the scope of disclosure is not limited as such. The electrodes 878, 880 make electrical contact with the casing 882 due to gravity and without the assistance of springs or arms.

The various configurations shown above with respect to FIGS. 3-8C are merely illustrative. They may be modified as suitable. For instance, the insulated sheath 604 shown in FIG. 6 may be adapted for use in one or more of the embodiments shown in FIGS. 3-5 and 7-8C. Similarly, the intertwined wires shown in FIG. 5 may be adapted for use in any of the embodiments described herein. In another example, one or more of the embodiments described above may include an insulating gap sub disposed in the casing between the excitation and return electrodes. In such embodiments, more current flows downhole toward the end of the well than would be the case in a similar configuration lacking such a gap sub. Current may still flow toward the return, but it would be routed through the adjacent formation, which has a higher resistivity than the casing. All such variations and combinations fall within the scope of the disclosure.

Figure 9:
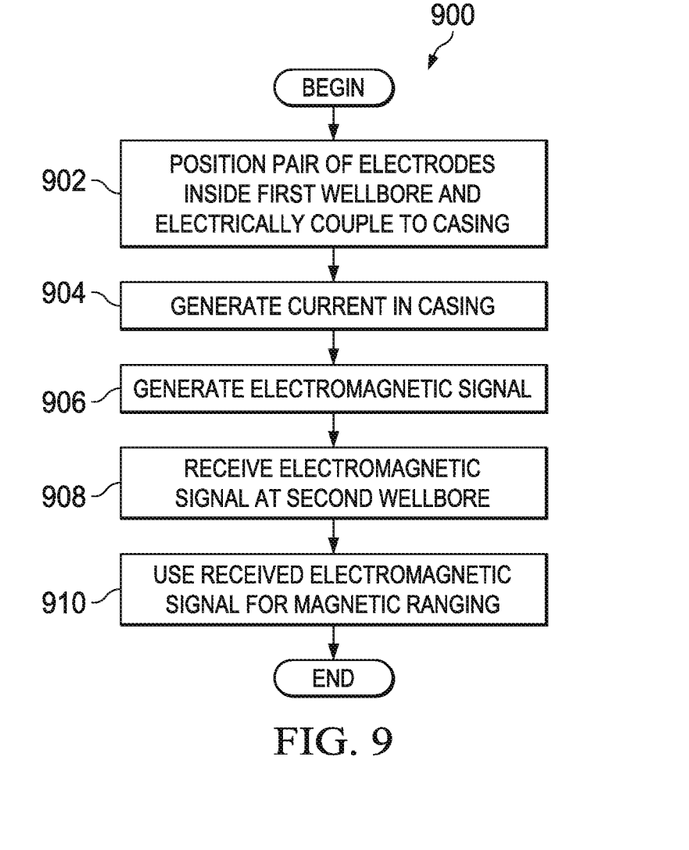
FIG. 9 is a flow diagram of a magnetic ranging method.

FIG. 9 is a flow diagram of a magnetic ranging method 900. The method 900 begins by positioning a pair of electrodes—an excitation electrode and a return electrode—inside a first wellbore and electrically coupling the electrodes to the casing (step 902). The method 900 then includes generating a current in the casing using the electrodes (step 904). The method 900 further includes generating an electromagnetic signal as a result of the current flow in the casing (step 906). The electromagnetic signal is detected by one or more sensors in a second wellbore (step 908) and the detected signals are then used to determine a distance between the first and second wellbores (step 910). The method 900 may be modified as desired by adding, deleting, rearranging or modifying one or more steps.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

At least some embodiments are directed to a magnetic ranging system that comprises: a wellbore in a formation; a conductive casing in said wellbore; and excitation and return electrodes electrically coupled to the conductive casing, the excitation electrode positioned downhole relative to the return electrode, the excitation and return electrodes generating a current in the casing, said current resulting in an electromagnetic signal that propagates through said formation toward a sensor in another wellbore. Variations of such embodiments may include one or more of the following concepts, in any order and in any combination: wherein the return electrode couples to surface equipment using a first wire, and wherein the excitation electrode couples to the surface equipment using a second wire; wherein at least parts of the first and second wires are co-located within a single insulated sheath; wherein at least parts of the first and second wires are intertwined; wherein the second wire mechanically couples to the return electrode; wherein the second wire mechanically couples to the return electrode using a coupling device external to said return electrode; wherein the second wire mechanically couples to the return electrode by passing through an orifice in said return electrode; wherein the current is a direct current or an alternating current having a frequency greater than 0 Hertz and less than or equal to 200 Hertz; wherein the system uses the electromagnetic signal to determine a distance between the wellbore and said another wellbore; wherein a distance between the return electrode and the excitation electrode is greater than another distance between the excitation electrode and a downhole end of said casing.

At least some embodiments are directed to a system to perform magnetic ranging, comprising: a first wellbore having a conductive casing; an excitation electrode and a return electrode disposed within said first wellbore and electrically coupled to said conductive casing, said excitation and return electrodes used to generate a current in the casing; and a second wellbore having one or more sensors, wherein the current generates an electromagnetic signal in a formation between the first and second wellbores, said one or more sensors receive the electromagnetic signal, and wherein the system uses the received electromagnetic signal to determine a distance between the first and second wellbores. Variations of these embodiments may include one or more of the following concepts, in any order and in any combination: wherein the excitation and return electrodes are positioned on a wireline sonde, and wherein the sonde uses either a bow spring or a retractable arm to facilitate electrical coupling between the excitation electrode and the conductive casing and between the return electrode and the conductive casing; wherein the excitation and return electrodes couple to surface equipment using first and second wires, respectively; wherein the second wire is intertwined with at least a portion of the first wire; wherein the first wire passes through an orifice in the return electrode; wherein the first wire mechanically couples to the return electrode using a coupling device external to the return electrode.

At least some embodiments are directed to a magnetic ranging method, comprising: positioning a pair of electrodes inside a first wellbore to electrically couple to a casing of said first wellbore; generating a current within the casing using the pair of electrodes, said current generating an electromagnetic signal in a formation between the first wellbore and a second wellbore; receiving said electromagnetic signal at the second wellbore; and using said received electromagnetic signal to determine a distance between the first and second wellbores. One or more of these embodiments may be modified using any of the following concepts, in any order and in any combination: wherein positioning said pair of electrodes comprises dropping at least one of said electrodes to refusal; further comprising adjusting a distance between the electrodes in said pair to modify an amount of current flowing toward a downhole end of said first wellbore; further comprising positioning an insulating gap sub in the casing between the pair of electrodes.

The following is claimed:

1. A magnetic ranging system, comprising:
   a conductive casing disposed in a wellbore;
   an excitation electrode and a return electrode within and electrically coupled to the conductive casing, the excitation electrode electrically coupled to a first insulated wire and positioned at a distance from the return electrode that is electrically coupled to a second insulated wire;
   a coupling device disposed on an exterior of the return electrode and having a conduit running along at least a lengthwise portion of the return electrode and through which the first insulated wire passes; and
   a power supply coupled to the excitation electrode via a first insulated wire and to the return electrode via a second insulated wire, the power supply configured to generate a current in the conductive casing including current between the excitation electrode and the return electrode, said current resulting in an electromagnetic signal that propagates through said formation.

2. The system of claim 1, wherein the return electrode couples to the power supply using the second insulated wire, and wherein the excitation electrode couples to the power supply using the first insulated wire.

3. The system of claim 2, wherein at least parts of the first and second insulated wires are co-located within a single insulated sheath.

4. The system of claim 2, wherein at least parts of the first and second insulated wires are intertwined.

5. The system of claim 2, wherein the first insulated wire mechanically couples to the return electrode via said coupling device.

6. The system of claim 1, wherein the current is an alternating current having a frequency greater than 0 Hertz and less than or equal to 200 Hertz.

7. The system of claim 1, wherein the electromagnetic signal propagates to another wellbore, and wherein the system uses the electromagnetic signal to determine a distance between the wellbore and said another wellbore.

8. The system of claim 1, wherein the distance between the return electrode and the excitation electrode is greater than another distance between the excitation electrode and a downhole end of said conductive casing.

9. The system of claim 1, wherein the return electrode is disposed at least 100 meters within the wellbore, and wherein the excitation electrode is separated from the return electrode along a length of the conductive casing by at least 100 meters.

10. The system of claim 1, wherein the excitation and return electrodes are positioned on a wireline sonde, and wherein the sonde is coupled to a bow spring configured to push against a side of the conductive casing opposite a side of the conducting casing that faces the excitation electrode and the return electrode to facilitate electrical coupling between the excitation electrode and the conductive casing and between the return electrode and the conductive casing.

11. A system for performing magnetic ranging, comprising:

a conductive casing within a first wellbore;

an excitation electrode electrically coupled to a first insulated wire and a return electrode electrically coupled to a second insulated wire, the excitation and return electrodes disposed within said first wellbore and electrically coupled to said conductive casing, said excitation electrode positioned at a distance from the return electrode along a length of the conductive casing, wherein the excitation and return electrodes are positioned on a sonde, and wherein the sonde is coupled to a bow spring configured to push against a side of the conductive casing opposite a side of the conductive casing that faces the excitation electrode and the return electrode to facilitate electrical coupling between the excitation electrode and the conductive casing and between the return electrode and the conductive casing;

a power supply coupled to the excitation and return electrodes and configured to generate a current in the conductive casing including current between the excitation electrode and the return electrode; and a second wellbore having one or more sensors, wherein the current generates an electromagnetic signal in a formation between the first and second wellbores, said one or more sensors receive the electromagnetic signal, and wherein the system uses the received electromagnetic signal to determine a distance between the first and second wellbores.

12. The system of claim 11, wherein the excitation and return electrodes couple to surface equipment using the first and second insulated wires, respectively.

13. The system of claim 12, wherein the second insulated wire is intertwined with at least a portion of the first insulated wire.

14. The system of claim 11, wherein the first insulated wire passes through an orifice in the return electrode.

15. The system of claim 11, wherein the return electrode is disposed at least 100 meters within the wellbore, and wherein the excitation electrode is separated from the return electrode along a length of the conductive casing by at least 100 meters.

16. The system of claim 11, further comprising a coupling device disposed on an exterior of the return electrode and having a conduit running along at least a lengthwise portion of the return electrode and through which the first insulated wire passes.

* * * * *